United States Patent [19]

Torpey

[11] 4,035,290

[45] July 12, 1977

[54] METHOD FOR THE TREATMENT OF WASTEWATER

[75] Inventor: Wilbur N. Torpey, Douglaston, N.Y.

[73] Assignee: Autotrol Corporation, Milwaukee, Wis.

[21] Appl. No.: 612,298

[22] Filed: Sept. 11, 1975

Related U.S. Application Data

[60] Continuation-in-part of Ser. No. 364,508, May 29, 1973, Pat. No. 3,905,899, which is a division of Ser. No. 306,584, Nov. 15, 1972, Pat. No. 3,776,841.

[51] Int. Cl.² ............................................. C02C 1/04
[52] U.S. Cl. ................................... 210/14; 210/17; 210/151
[58] Field of Search ..................................... 210/3–8, 210/14–17, 150, 151, 253

[56] References Cited

U.S. PATENT DOCUMENTS

| | | | |
|---|---|---|---|
| 1,646,478 | 10/1927 | Elrod | 210/151 |
| 1,991,896 | 2/1935 | Hays | 210/17 |
| 3,466,241 | 9/1969 | Simpson | 210/17 |
| 3,575,849 | 4/1971 | Torpey | 210/17 |
| 3,703,462 | 11/1972 | Smith | 210/17 |
| 3,776,841 | 12/1973 | Torpey | 210/17 |
| 3,849,304 | 11/1974 | Torpey et al. | 210/14 |
| 3,878,097 | 4/1975 | Mochizuki | 210/151 |
| 3,905,899 | 9/1975 | Torpey | 210/14 |
| 3,932,273 | 1/1976 | Torpey et al. | 210/17 |

Primary Examiner—Thomas G. Wyse
Assistant Examiner—Peter A. Hruskoci
Attorney, Agent, or Firm—Quarles & Brady

[57] ABSTRACT

A method for the biological treatment of wastewater and the removal of solids from the treated wastewater. Separate streams of wastewater are supplied in parallel to left and right biological treatment zones of a treatment tank having three biological treatment zones. The partially treated streams are combined and supplied to the central biological treatment zone after which the combined streams are directed to a subjacent settling zone wherein solids are removed.

6 Claims, 4 Drawing Figures

4,035,290

METHOD FOR THE TREATMENT OF WASTEWATER

RELATED APPLICATIONS

This application is a continuation in part of copending application Ser. No. 364,508 filed May 29, 1973 and now U.S. Pat. No. 3,905,899 issued Sept. 16, 1975 which is a division of application Ser. No. 306,584 filed Nov. 15, 1972 now U.S. Pat. No. 3,776,841. Priority benefits under 35U.S.C.120 based on these applications is hereby claimed.

BACKGROUND OF THE INVENTION

The invention pertains to the treatment of wastewater to remove pollutants. More specifically, the invention provides method for the biological treatment of wastewater for the oxidation of carbonaceous pollutants, usually expressed as $BOD_5$ and the physical removal of particulate matter. The method of the present invention employs rotating partially submerged biological contactors to grow aerobic biological slimes for the oxidation of carbonaceous matter and a settling zone subjacent to the contactors for removal of particulate matter from the biologically treated wastewater.

$BOD_5$ is a measure of the concentration of biodegradable organic carbon in a medium obtained by determining the amount of oxygen consumed (mg/l) by the medium at 68° F in 5 days. The term filtrate $BOD_5$ is used to define the amount of soluble and colloidal carbonaceous matter present in wastewater after filtration of all particles larger than about 0.5 micron. The expression filtrate $BOD_5$ loading rate is used herein to express the amount of filtrate $BOD_5$ supplied per day per 1,000 square feet of contactor surface i.e. (lbs/day/1,000 sq.ft.). All percentages are by weight unless otherwise specified.

U.S. Pat. No. 3,575,849 issued to Torpey discloses a method and apparatus for biologically treating wastewater including a treatment tank having a biological treatment zone in its upper portion and a quiesent settling zone in its lower portion. The biological treatment zone includes a plurality of parallel rotatable shafts disposed across the upper portion of the tank; each of the shafts supporting a plurality of biological contactors, typically thin discs. The contactors extend into the wastewater in the tank to less than half the tank depth, providing a subjacent settling zone for sloughed off solids. The surface of the biological contactors is alternately exposed to the atmosphere and wastewater at suitable intervals to promote the growth of aerobic biological slimes.

The Torpey U.S. Pat. No. 3,776,841 discloses a wastewater treatment tank having an upper biological treatment zone including rotating partially submerged contactors to grow aerobic biological slimes and a subjacent settling zone. The subjacent settling zone is physically separated from the biological treatment zone by a false bottom or longitudinal baffle. Wastewater is introduced into the upper biological treatment zone, flows through the upper zone, around the longitudinal baffle and into and through the subjacent settling zone to a treated wastewater outlet.

The Torpey et al U.S. Pat. No. 3,849,304 discloses a treatment tank including a plurality of adjacent upper biological treatment bays employing rotating contactors and a plurality of lower subjacent settling zones. The upper biological treatment zones and the lower settling zones are separated by a horizontal baffle extending across the tank. Raw wastewater enters the lower settling zone of one of the bays wherein solids are removed, and is then vertically directed into and through the upper biological treatment zone of the first bay. From the first bay the wastewater is horizontally directed into and through the biological treatment zone of the second bay and is subsequently vertically directed into and through the lower settling zone of the second bay. Preferably, two secondary bays, each receiving about one half of the wastewater flow from the first bay, are provided.

Pending application Ser. No. 523,704 now U.S. Pat. No. 3,932,273 by Torpey et al. discloses a method utilizing a composite apparatus for the treatment of wastewater to remove settleable and floatable solids and to remove and oxidize organic matter including a treatment tank having at least two horizontally adjacent bays, each of the bays having an upper biological treatment zone separated by a horizontally disposed baffle from a lower settling zone. Raw wastewater enters the lower settling zone of one of the bays wherein settleable and floatable solids are removed, and then turns vertically to flow in a reverse direction through the upper biological treatment zone of each bay. From the upper treatment zones the wastewater is directed into and through the lower settling zone of the second bay from which the treated fluid is removed.

The U.S. Pat. No. 3,563,383 to Hellquist, pertains to a complete method for treating organically polluted wastewater including biological treatment using partially submerged contactors in the upper portion of a section of the treatment unit. The Hellquist system utilizes a plurality of separate bays arranged in series for primary settling before the wastewater enters the biological treatment section.

SUMMARY OF THE INVENTION

The present invention provides a treatment tank having facilities for biologically treating wastewater and subsequently removing solids, primarily sloughed off slimes from the biological treatment, from the treated wastewater.

The treatment tank, which can be an existing settling tank modified in accordance with the invention or a new tank has at least three horizontally adjacent bays disposed in the upper portion of a treatment tank, i.e. a central primary bay and left and right secondary bays. Each bay employs rotating partially submerged contactors and defines a biological treatment zone for the biological treatment of wastewater to oxidize carbonaceous pollutants. A settling zone, substantially coextensive with the upper biological treatment zones, is provided in the lower portion of the treatment tank and is separated from the upper bays by a horizontally disposed baffle located immediately below the contactors.

The method of the invention provides for the continuous treatment of wastewater and includes the steps of: introducing a first stream of wastewater into the biological treatment zone of the left secondary bay; introducing a second stream of wastewater into the biological treatment zone of the right secondary bay; creating a parallel flow of each of the first and second streams through the biological treatment zones of said left and right biological treatment zones, in the same direction; horizontally directing the first and second streams into the biological treatment zone of the primary bay; creating a flow of said combined first and second streams through the primary biological treatment zone in a direction countercurrent to the flow of the first and second streams through the left and right biological treatment zones; vertically directing the combined first and second streams from the primary biological treatment zone to the lower settling zone; creating a flow of the combined first and second streams through said lower settling zone in a direction countercurrent to the flow of the combined first and second streams in said primary biological treatment zone, and removing the combined first and second streams from said lower settling zone.

According to a further aspect of the invention, a method for the continuous treatment of wastewater is provided wherein the filtrate $BOD_5$ loading rate for each biological treatment zone of a unit having multiple biological treatment zones can be substantially the same. In accordance with this aspect of the invention, the new method includes the steps of dividing a flow of wastewater into at least two streams; introducing each of said streams into a biological treatment zone employing rotating biological contactors; removing from about 30 to about 70 percent by weight, preferably about 50 percent, of the filtrate $BOD_5$ from each stream, combining the streams; introducing the combined streams into a primary biological treatment zone employing rotating biological contactors; removing from about 30 to about 70 weight percent of the remaining filtrate $BOD_5$ in the primary biological treatment zone and introducing the treated wastewater into a settling zone wherein sloughed off solids from the contactors are removed.

These and further objectives of the invention will be more apparent from the following detailed description of the invention read in view of the accompanying drawing in which.

DESCRIPTION OF PREFERRED EMBODIMENTS

Figure 1:
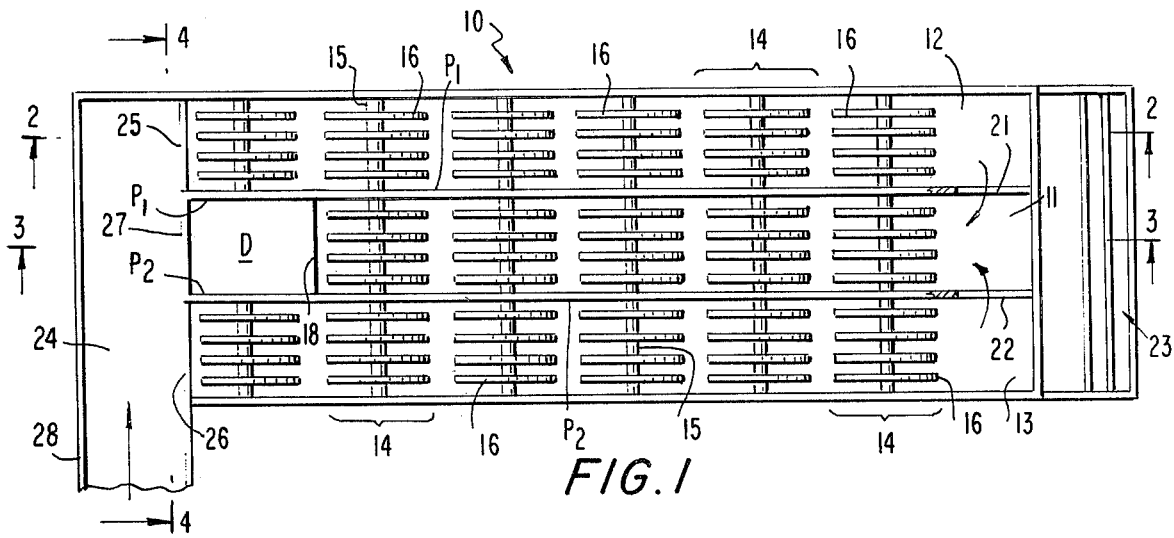
FIG. 1 is a plan view of a treatment tank according to the invention.
Figure 3:
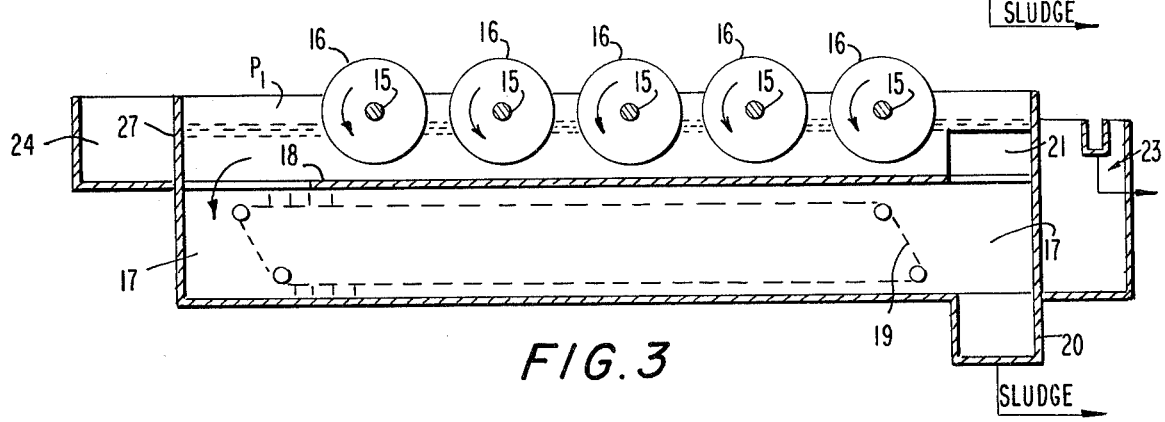
FIG. 3 is a cross-sectional elevation view taken along line 3—3 of FIG. 1.
Figure 4:
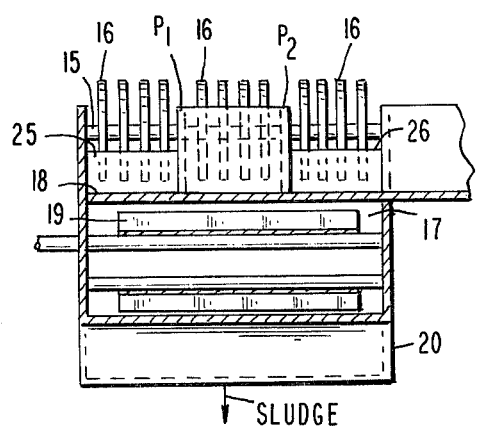
FIG. 4 is a cross-sectional elevation view taken along line 4—4 of FIG. 1.

Referring to the drawing, a three bay treatment tank 10 embodying the principles of the invention is shown. The treatment tank 10 is composed of a central or primary bay 11 and right and left secondary bays 12 and 13 that are horizontally adjacent to bay 11 and separated therefrom by partitions $P_1$ and $P_2$. Each of the bays 11, 12 and 13 defines an upper biological treatment zone including a plurality of parallel biological contactor assemblies 14, each of which includes a rotatably mounted shaft 15. Each shaft 15, in turn supports a plurality of concentrically and fixedly mounted contactors 16, which provide surface area upon which biological slimes may grow. The shafts 15 are preferably mounted above the usual level of wastewater in the tank unit to simplify mechanical construction although submergence of the contactors 16 can be varied from about one-third to two-thirds of their diameter. FIG. 1 of the drawing shows a common shaft 15 for each bank of contactors extending across the three bays of tank 10. This arrangement simplifies the driving of the shafts to rotate the contactors but results in the contactors of the central or primary bay rotating in a direction counter to the direction of wastewater flow through the biological treatment zone of the primary bay 10 as shown by the arrows in FIG. 3. Alternatively, each of bays 11–13 can have independent contactor shafts that are rotated by separate driving means to rotate the separate banks of contactors in any desired direction.

Although the rotatable biological contactors of the invention may take different forms such as drums, cylinders, brushes or thin, closely spaced discs, it is preferred to use contactors having a discontinuous honeycomb type structure such as that disclosed in pending U.S. application Ser. No. 252,038 filed May 10, 1972 now U.S. Pat. No. 3,827,559. Thin discs are also advantageous biological contactors since they facilitate a high concentration of surface area per unit volume of biological treatment zone and can be used to impart a pumping effect to the wastewater. Suitable biological contactors can be constructed of many available materials, although plastics and lightweight metals are generally preferred.

As previously mentioned, driving means (not shown) are provided to rotate shafts 15 to impart a predetermined peripheral velocity to the contactors 16. Advantageously, the driving means are capable of imparting rotational forces to shafts 15 variable in magnitude and direction. This allows for the accommodation of varying wastewater flow rates through the tank 10 and provides for the mechanical removal of excessive slime growth from the surface of contactors 16 when and if desired. Preferably, the directional component of the peripheral velocity of the discs at their lowermost portion is in the direction of wastewater flow through the biological treatment zone of each bay.

The bays 11, 12 and 13 are physically separated from the lower settling zone 17 by a longitudinal baffle 18 that extends across the tank 10. The settling zone 17 extends across the tank and is subjacent to and substantially co-extensive with the bays 11, 12 and 13. A sludge collection mechanism 19 is provided in the settling zone 17 to remove the sludge to the sump 20, for withdrawal and to subsequent disposal (not shown). The sludge collection mechanism 19 can be chosen from those presently in widespread use.

In accordance with a specific aspect of the invention, the longitudinal baffle 18 which forms a false floor for each of the upper biological treatment zones, extends across the full width of each of bays 11, 12 and 13 and along substantially all of the long dimension of the tank. A sufficient space, indicated as D in the drawing is provided at an end of the central bay 11 between baffles $P_1$ and $P_2$ to permit the wastewater to flow downwardly into the settling zone 17 from the central bay 11. The downward velocity of the wastewater as it flows from the central bay 11 to the lower settling zone 17 should be from about 0.3 to about 1.0 feet per second. The biologically treated wastewater flows through the settling zone 17 toward outlet 23, by which it is removed from the system for further treatment such as a downstream settling tank or filtration apparatus, as desired.

In further accordance with the invention, ports 21 and 22 are provided in partitions $P_1$ and $P_2$ to permit partially treated wastewater to flow from bays 12 and 13 into bay 11 after having been biologically treated in bays 12 and 13. The combined wastewater streams flow through bay 11 in a direction counter to the direction of wastewater flow in the secondary bays 12 and 13.

Figure 2:
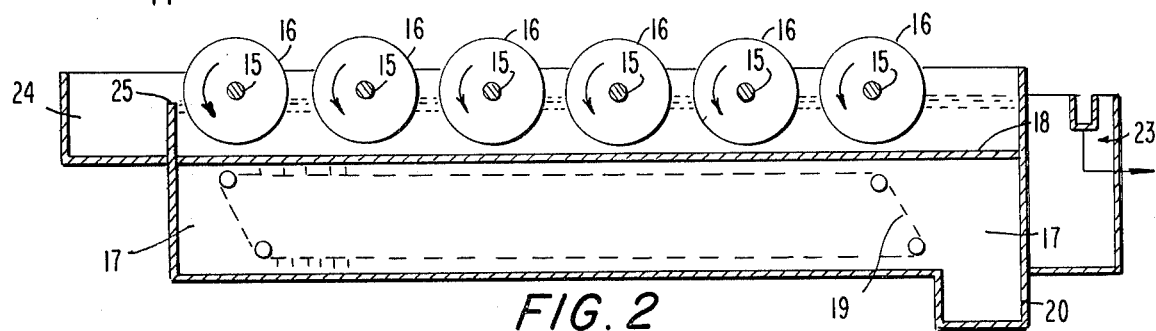
FIG. 2 is a cross-sectional elevation view taken along line 2—2 of FIG. 1.

A secondary bay or biological treatment zone 12 is shown in greater detail in FIG. 2 of the drawing. Secondary bay 13 is similar in all respects. Wastewater distribution means including a chamber 24 and weir plate separating the chamber from the biological treatment zones is provided. The weir plate includes right portion 25, left portion 26 and central portion 27; the right and left weir plate portions 25 and 26 being adjacent to the right and left secondary bays 12 and 13 respectively, and the central weir plate portion 27 being adjacent the central bay 11. According to the invention, the weir plate portions 25, 26 are lower than the weir plate portion 27 and are adapted to permit wastewater flow from the chamber 24 into the biological treatment bays 12 and 13 while weir plate portion 27 is high enough to prevent wastewater flow into the central bay 11 from the chamber 24. Preferably the wastewater flow rate into bays 12 and 13 is about the same. Inlet conduit 28 is provided to supply a flow of wastewater to the chamber 24.

According to a specific aspect of the invention, a flow of wastewater entering chamber 24 is divided into two substantially equal streams that flow through biological treatment zones 12 and 13 wherein from about 30 to about 70 percent, preferably 50% filtrate $BOD_5$ is removed from each stream. The streams are then combined through port 21 and 22 in biological treatment zone 11. Preferably each of the biological treatment zones 11, 12 and 13 includes about the same contactor surface area and each zone has about the same filtrate $BOD_5$ loading rate. For example, bays 12 and 13 each remove one-half (50 weight percent) of the filtrate $BOD_5$ from one-half of the wastewater flow to the unit. The combined stream that is introduced into bay 11 comprises twice the wastewater flow rate (gal/day) entering either of the bays 12 and 13. However, since 50% of the filtrate $BOD_5$ has already been removed from the combined streams, the filtrate $BOD_5$ loading rate lbs/day/1,000 sq.ft.) on bay 11 is about the same as that on bays 12 and 13, assuming all bays contain about the same contactor surface area.

It is preferred to limit the immersion depth of contactors 16 to less than one half the depth of the bays. For practical purposes the diameter of contactors 16 will be between about 6 to 15 feet and immersion depth less than half of the diameter.

To encourage the growth of biological slimes by alternately immersing them in the wastewater and exposing them to the atmosphere, the contactor assemblies 14 are rotated at a suitable predetermined velocity. From a practical standpoint, the peripheral velocity of the discs should not exceed about 1 foot per second, and must be sufficiently high to avoid excessive immersion of the biological slimes. To provide the microorganisms in the slime with oxygen sufficient to satisfy their metabolic processes, the immersion time of the slimes typically should not exceed about 10 seconds. As the wastewater becomes progressively clarified the immersion time of the slimes can be increased gradually to about 30 seconds. For smaller diameter contactors, the peripheral velocity can be reduced substantially while avoiding excessive immersion time, while the larger diameter contactors usually require that the rotational velocity be substantially increased to avoid excessive immersion time. Therefore, the peripheral velocity of the contactors 16 for normal operation preferably should be between about 0.5 and 1.5 feet per second.

The contactors 16 should be spaced as close as practicable on shafts 15 in order to obtain maximum concentration of disc surface area per unit volume of assembly. However, allowance must be made for adequate contact time of the wastewater with the 1/32 inch to ⅛ inch thick slimes that develop on the contactor surfaces.

In operation, it should be realized that wastewater treatment plants are subject to diurnal variations in flow. During the early morning hours, from about 2 a.m. and 6 a.m. the flow of wastewater to the plant can be and usually is a small fraction of that during daytime periods. In order to adapt the biological treatment plant of the invention to these variations in wastewater flow, an automatic control system can be provided to control the peripheral velocity of the contactors to accommodate changes in flow rate.

The method of the invention provides a relatively inexpensive and practical means for substantially upgrading wastewater treatment plants. The invention can be applied to primary sedimentation tanks, which were designed to remove only the settable solids from the raw wastewater and can be modified to provide biological treatment in addition to their original function. Treatment plants that are presently removing from 30–60% of the $BOD_5$ in the wastewater can be upgraded economically to remove from 80–90% of $BOD_5$ pollutants by applying the principles of the invention to the plant.

In addition to substantially upgrading existing wastewater treatment plants, the method and apparatus of the invention can be the basis for new plant design. A single tank wastewater treatment plant capable of removing over 90% of $BOD_5$ from wastewater can be provided at a fraction of the cost of a conventional activated sludge or a trickling filter plant effecting the same degree of clarification.

It should be understood that the method of the invention has been described in relation to specific applications for illustrative purposes only. The term longitudinal baffle should read to include any horizontally disposed baffle that folds the wastewater flow between a biological treatment zone and a subjacent settling zone. Variations and modifications of the examples can be made without departing from the clear teachings and spirit of the invention. Accordingly, reference should be made to the following appended claims in determining the full scope of the invention.

I claim:

1. A method for the continuous treatment of wastewater, comprising the steps of:
    providing a treatment tank having:
        a horizontally disposed baffle extending longitudinally of and across said tank and separating said tank into an upper biological treatment zone and a vertically adjacent lower settling zone extending across the full tank width;
    partition means extending along the length of the tank transverse to said physical means and dividing said biological treatment zone into a central bay and a left and a right secondary bay, each of said secondary bays being horizontally adjacent said central bay;
    each of said primary and secondary bays including a plurality of biological contactors partially submerged in said wastewater;

said contactors being disposed parallel to the direction of wastewater flow through said primary and secondary bays;
an inlet at one end of said tank; and
an outlet at the opposite end of said tank;
introducing a first stream of wastewater into said left secondary bay at said inlet end of said tank;
introducing a second stream of wastewater into said right secondary bay at said inlet end of said tank;
creating a parallel flow of said first and second streams through the left and right secondary bays in the same direction away from said inlet end;
rotating said biological contactors in said left and right secondary bays to biologically treat said first and second steams of wastewater while flowing away from said inlet end;
horizontally directing said first and second streams into said primary bay to combine said streams;
creating a flow of said combined first and second streams through said primary bay in a direction countercurrent to the flow of said first and second streams through said left and right secondary bays and toward said inlet end;
rotating said biological contactors in said primary bay to biologically treat said combined first and second streams;
vertically directing said combined first and second streams from said primary bay to said lower settling zone at said inlet end;
creating a flow of said combined first and second streams through said lower settling zone in a direction countercurrent to the flow of said combined first and second streams in said primary bay and away from said inlet end; and
removing said combined first and second streams from said lower settling zone at said outlet end.

2. The method as recited in claim 1, wherein said biological contactors are rotated at a rate sufficient for the growth and maintenance of aerobic biological slimes.

3. The method as recited in claim 1, wherein the flow rate of said first stream through said left secondary bay is substantially the same as the flow rate of said second stream through said right secondary bay.

4. The method as recited in claim 1, wherein from about 30 to about 70 percent by weight of the filtrate $BOD_5$ in each of said first and second streams is removed in said left and right secondary bays.

5. The method as recited in claim 4, wherein from about 30 to about 70 percent by weight of the filtrate $BOD_5$ remaining in said combined first and second streams is removed in said primary bay.

6. The method as recited in claim 5, wherein said primary and secondary bays all include about the same amount of contactor surface area.

* * * * *

UNITED STATES PATENT OFFICE
CERTIFICATE OF CORRECTION

Patent No. 4,035,290　　　　　　　Dated July 12, 1977

Inventor(s) Wilbur N. Torpey

It is certified that error appears in the above-identified patent and that said Letters Patent are hereby corrected as shown below:

Column 2, line 13, "523,704" should read -- 523,701 --.

Column 5, line 39, "rate lbs/day/100" should read

-- rate (lbs/day/100 --.

Signed and Sealed this

Twenty-first Day of March 1978

[SEAL]

Attest:

RUTH C. MASON　　　　　　　LUTRELLE F. PARKER
*Attesting Officer*　　　　*Acting Commissioner of Patents and Trademarks*